UNITED STATES PATENT OFFICE.

JACOB REESE, OF PHILADELPHIA, PENNSYLVANIA.

PHOSPHATIC FERTILIZER.

SPECIFICATION forming part of Letters Patent No. 450,531, dated April 14, 1891.

Application filed December 11, 1890. Serial No. 374,295. (No specimens.)

*To all whom it may concern:*

Be it known that I, JACOB REESE, a citizen of the United States, residing at Philadelphia, in the county of Philadelphia and State of Pennsylvania, have invented certain new and useful Improvements in Phosphatic Fertilizers; and I do hereby declare the following to be a full, clear, and exact description of the invention, such as will enable others skilled in the art to which it appertains to make and use the same.

This invention consists in mixing phosphatic basic slag and muriate of potash and pulverizing them before or after mixture and applying the same to the earth as plant-food. The manner of grinding and preparing the slag is fully described in my patent, No. 372,087, dated October 25, 1887.

By mixing different percentages of the muriate of potash with the basic slag a compound may be made suitable for the wants of different crops. A mixture of four parts of basic slag and one part of muriate of potash will contain a sufficient amount of potash for the average plant.

When potassic phosphates are prepared in the manner herein described and applied to the earth, they are of high grade, cheap in cost, dry and free from offensive odor, and in such a chemical condition as to be quickly absorbed by the plants.

What I claim, and desire to secure by Letters Patent, is—

A fertilizer composed, essentially, of muriate of potash and pulverized calcareous phosphatic basic slag.

JACOB REESE.

Witnesses:
JOHN C. PENNIE,
H. W. ELMORE.